(12) United States Patent
Lin

(10) Patent No.: US 10,560,630 B1
(45) Date of Patent: Feb. 11, 2020

(54) CAMERA HAVING FAR-NEAR FOCUS SWITCHING FUNCTION

(71) Applicant: Shenzhen Aobaisen Electronic Technology Co., Ltd., Shenzhen (CN)

(72) Inventor: Shaomin Lin, Shenzhen (CN)

(*) Notice: Subject to any disclaimer, the term of this patent is extended or adjusted under 35 U.S.C. 154(b) by 0 days.

(21) Appl. No.: 16/451,664

(22) Filed: Jun. 25, 2019

(30) Foreign Application Priority Data

Apr. 16, 2019 (CN) ................ 2019 2 0510619 U

(51) Int. Cl.
*H04N 5/232* (2006.01)
*G03B 13/32* (2006.01)
*H04N 5/225* (2006.01)

(52) U.S. Cl.
CPC ......... *H04N 5/23245* (2013.01); *G03B 13/32* (2013.01); *H04N 5/2254* (2013.01); *H04N 5/225251* (2018.08)

(58) Field of Classification Search
CPC ......... H04N 5/23245; H04N 5/225251; H04N 5/2254; G03B 13/32
See application file for complete search history.

(56) References Cited

U.S. PATENT DOCUMENTS

| | | | |
|---|---|---|---|
| 2006/0187338 A1* | 8/2006 | May ..................... | H04N 5/2254 348/375 |
| 2017/0353634 A1* | 12/2017 | Kim ....................... | G02B 5/005 |
| 2017/0353645 A1* | 12/2017 | Shabtay ............... | H04N 5/2254 |
| 2018/0160017 A1* | 6/2018 | Park ..................... | H04N 5/2258 |

\* cited by examiner

*Primary Examiner* — Nicholas G Giles
(74) *Attorney, Agent, or Firm* — HYIP

(57) ABSTRACT

The invention relates to the field of cameras, in particular to a camera which has a far-near focus switching function and includes a camera body, a display screen assembly and a lens assembly, wherein the camera body is connected with the display screen assembly through a rotating shaft, and the lens assembly is located in the camera body. The camera has the beneficial effect of realizing close-range shooting and long-range shooting without any assistance by means of random switching between a near-focus lens and a far-focus lens, and being easy to operate and lower in cost.

6 Claims, 5 Drawing Sheets

US 10,560,630 B1

CAMERA HAVING FAR-NEAR FOCUS SWITCHING FUNCTION

BACKGROUND OF THE INVENTION

Technical Field

The invention relates to the field of cameras, in particular to a camera having a far-near focus switching function.

Description of Related Art

In recent years, pick-up lenses are being more and more widely applied to the fields such as sports DVs, mobile phone cameras, automotive lenses, secure image monitoring, and electronic entertainment. However, existing lenses are prime lenses which only can fulfill close-range shooting or obtain slightly far scenes by enlarging pictures through software, or only can fulfill long-range shooting through certain auxiliary products, and cannot realize random switching between close-range shooting and long-range shooting. The existing lenses cannot fulfill close-range shooting and long-range shooting unless with the aid of other relevant products, thereby being inconvenient to use and carry, greatly reducing the usage experience, and increasing the usage cost.

BRIEF SUMMARY OF THE INVENTION

The objective of the invention is to overcome the above-mentioned defects of the prior art by providing a camera having a far-near focus switching function.

To fulfill the above objective, the technical solution adopted by the invention is as follows:

A camera having a far-near focus switching function includes a camera body, a lens assembly and a display screen assembly, wherein the camera body is connected with the display screen assembly through a rotating shaft, the lens assembly is located in the camera body, and a first PCB is arranged in the camera body; and the lens assembly includes a near-focus lens, a lens ring, a far-focus lens and a lens holder, wherein the near-focus lens has an end connected with the lens ring and an end connected with the lens holder, the far-focus lens and the lens holder are mounted in the camera body, and the near-focus lens and the far-focus lens are electrically connected with the first PCB.

Preferably, the display screen assembly includes a front screen cover, a rear screen cover, a display screen, a second PCB and buttons, wherein the front screen cover is fixedly connected with the rear screen cover, the second PCB is fixedly arranged between the front screen cover and the rear screen cover, the external surface of the display screen is mounted on the surface of the front screen cover, the buttons are arranged on the front screen cover, the display screen and the buttons are electrically connected with the second PCB, and the second PCB is electrically connected with the first PCB.

Preferably, the camera body is provided with a memory card slot; a USB interface is formed in one side of the memory card slot, and an earphone interface is formed in the other side of the memory card slot; and the memory card slot, the USB interface, and the earphone interface are electrically connected with the first PCB.

Preferably, the camera body is further provided with an on/off button, a cancel button, a shooting button and a video recording button which are electrically connected with the first PCB.

Preferably, a through hole is formed in a position, corresponding to the lens ring and the far-focus lens, of the camera body.

Preferably, the camera body is further provided with a battery pack electrically connected with the first PCB.

By adopting the above solution, the invention has the following beneficial effects:

The camera having a far-near focus switching function of the invention can fulfill close-range shooting and long-range shooting without the aid of any auxiliary products by randomly switching the near-focus lens and the far-focus lens, thereby being easy to operate and lower in cost.

REFERENCE SIGNS 1, camera body; 11, memory card slot; 12, USB interface; 13, earphone interface; 14, on/off button; 15, cancel button; 16, shooting button; 17, video recording button; 18, through hole; 19, battery pack; 20, display screen assembly; 21, front screen cover; 22, rear screen cover; 23, display screen; 24, second PCB; 25, button; 3, lens assembly; 31, near-focus lens; 32, lens ring; 33, far-focus lens; 34, lens holder; 4, rotating shaft; 5, first PCB.

DETAILED DESCRIPTION OF THE INVENTION

Embodiments of the invention are detailed as follows in combination with the drawings, and the invention can be implemented by various embodiments under the limitation and coverage of the claims.

Figure 1:
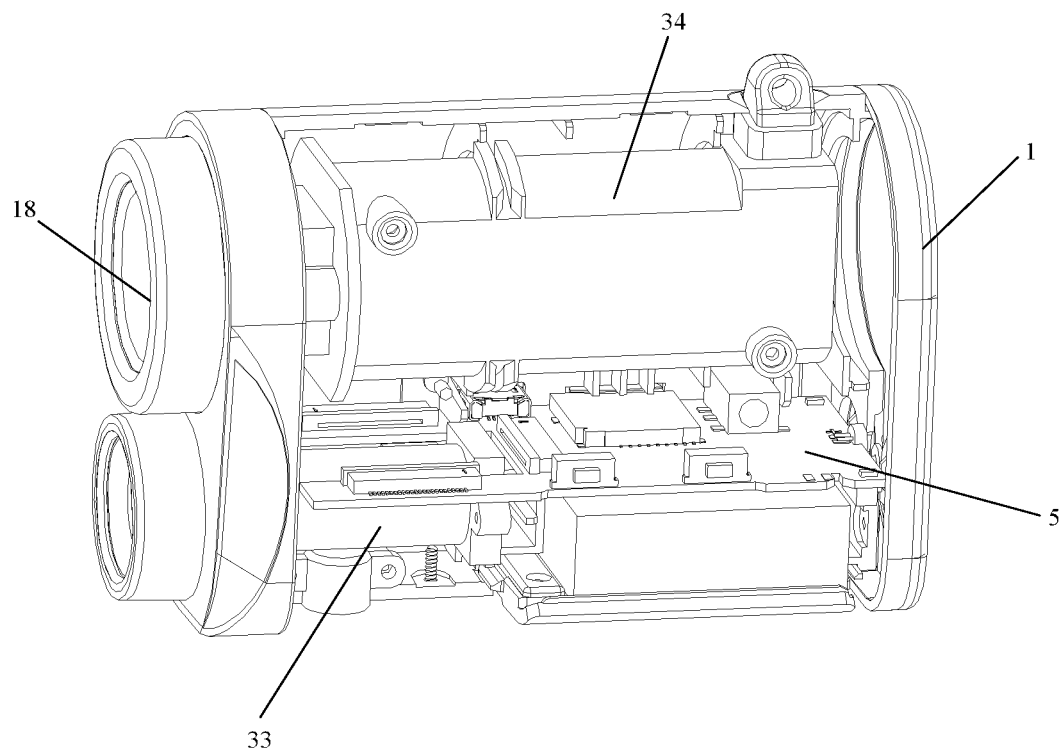
FIG. 1 is an internal structure view of a camera body of the invention.
Figure 2:
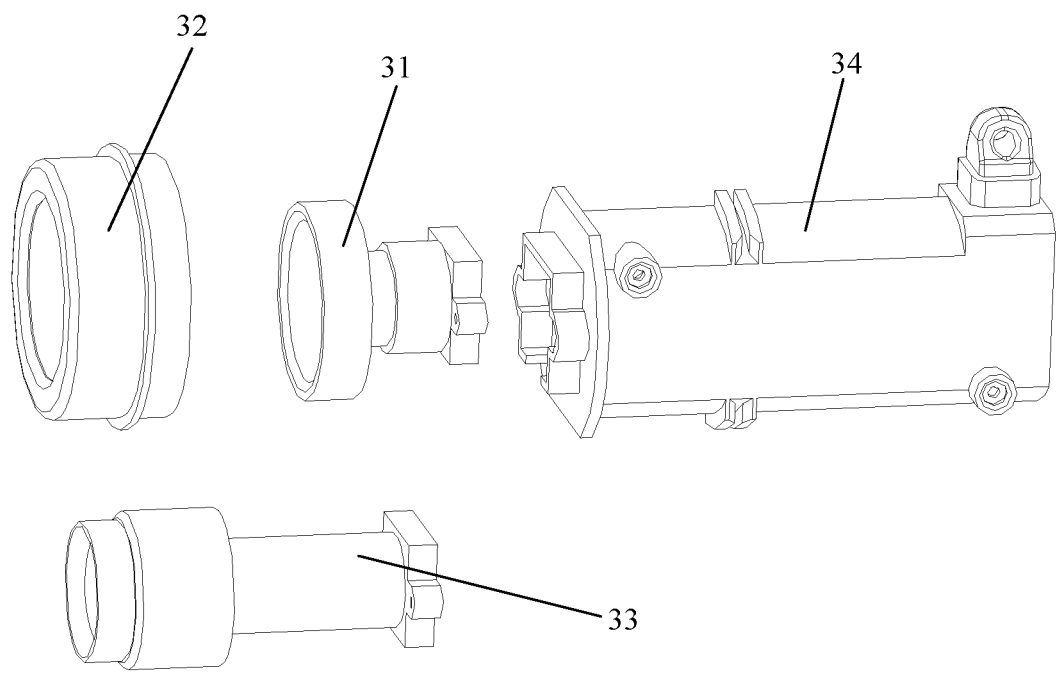
FIG. 2 is an exploded view of a lens assembly of the invention.
Figure 3:
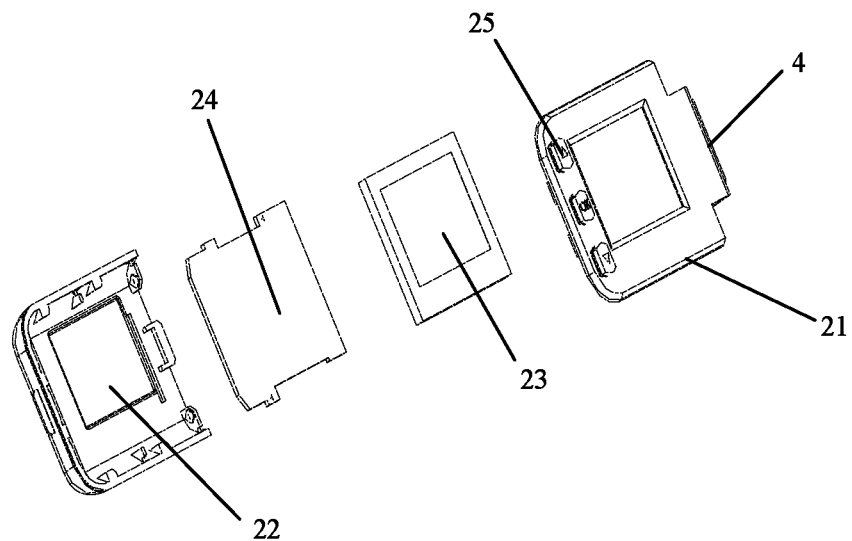
FIG. 3 is an exploded view of a display screen assembly of the invention.
Figure 4:
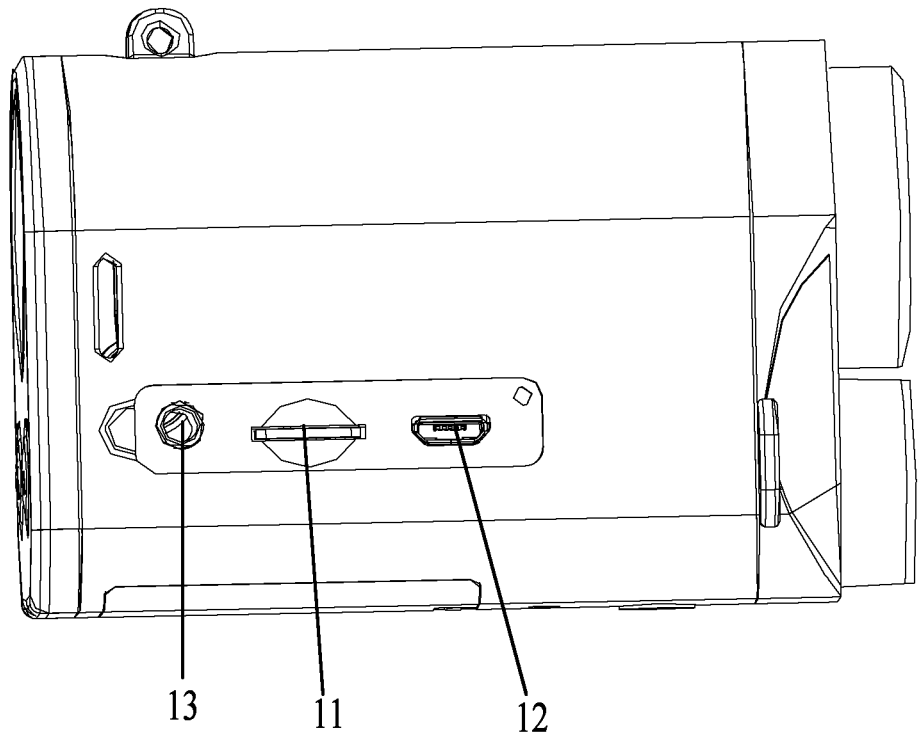
FIG. 4 is a right view of the camera body of the invention.
Figure 5:
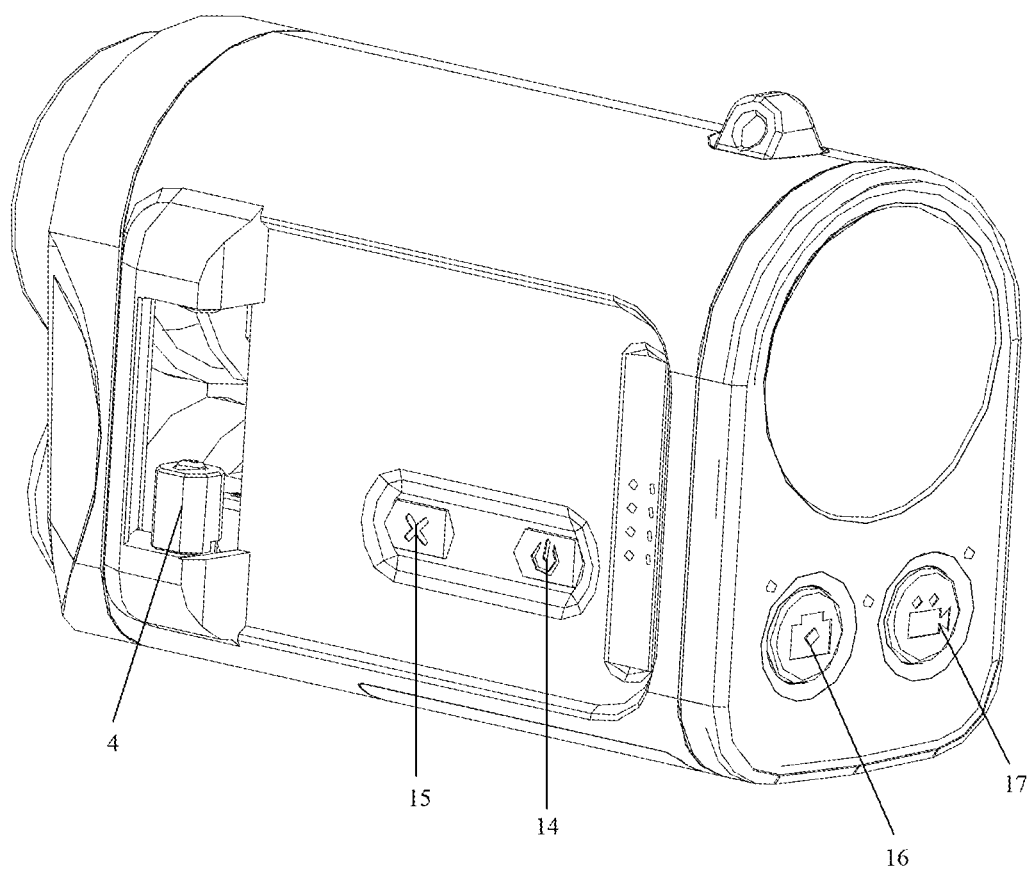
FIG. 5 is a view of buttons on the camera body of the invention.
Figure 6:
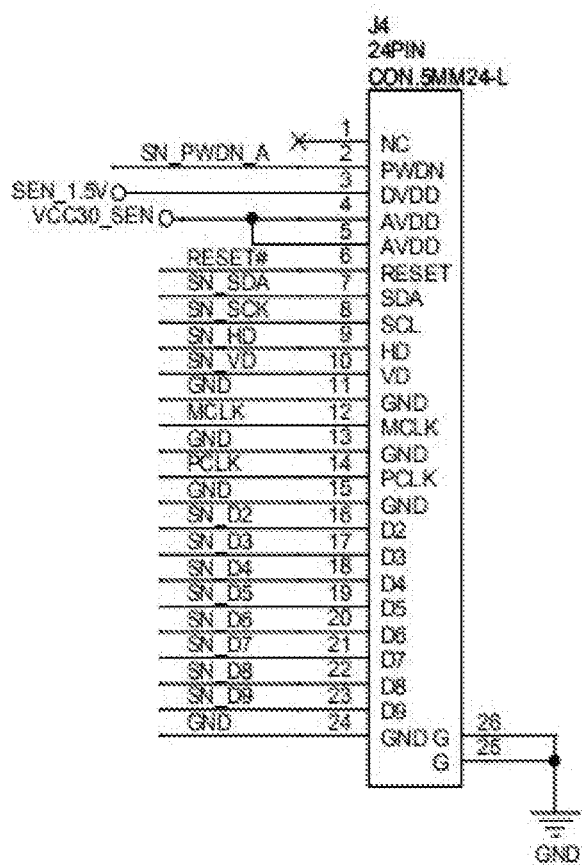
FIG. 6 is a view of chips on a near-focus lens and a far-focus lens of the invention.
Figure 7:
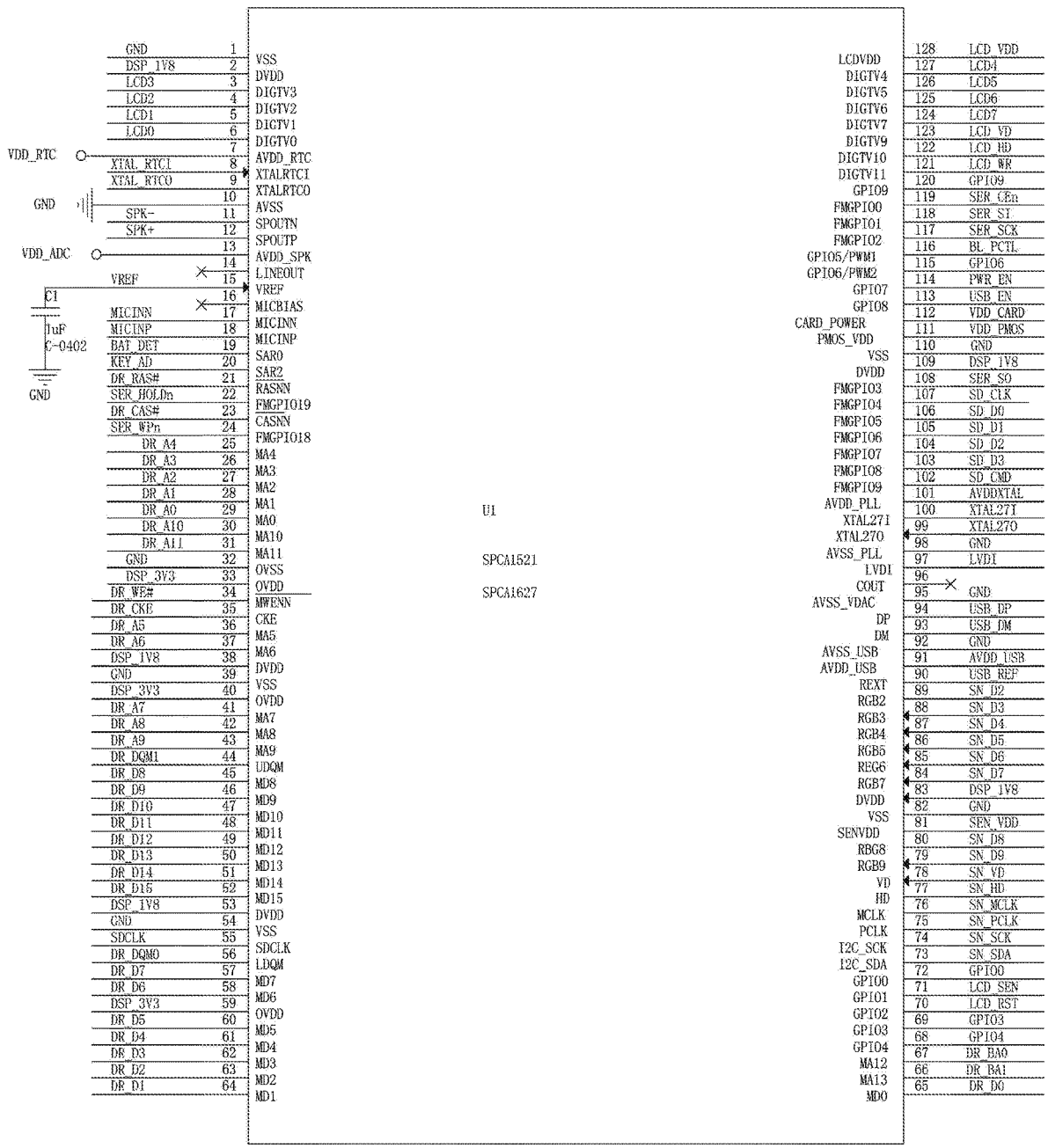
FIG. 7 is a view of CPU on a PCB of the invention.

As shown in FIG. 1 to FIG. 7, a camera having a far-near focus switching function includes a camera body 1, a display screen assembly 2 and a lens assembly 3, wherein the camera body 1 is connected with the display screen assembly 2 through a rotating shaft 4, the lens assembly 3 is located in the camera body 1, and a first PCB 5 is arranged in the camera body 1; and the lens assembly 3 includes a near-focus lens 31, a lens ring 32, a far-focus lens 33 and a lens holder 34, wherein one end of the near-focus lens 31 is connected with the lens ring 32, the other end of the near-focus lens 31 is connected with the lens holder 34, the far-focus lens 33 and the lens holder 34 are mounted in the camera body 1, and the near-focus lens 31 and the far-focus lens 33 are electrically connected with the first PCB 5.

In a preferred embodiment of the invention, the camera body 1 is connected with the display screen assembly 2 through the rotating shaft 4; the display screen assembly 2 includes a front screen cover 21, a rear screen cover 22, a display screen 23, a second PCB 24 and buttons 25, wherein the front screen cover 21 is fixedly connected with the rear screen cover 22; the second PCB 24 is fixedly arranged between the front screen cover 21 and the rear screen cover 22; the external surface of the display screen 23 is mounted on the surface of the front screen cover 21; the buttons 25 are arranged on the front screen cover 21; the buttons 25 include an UP button, a DOWN button and an OK button and are used for sequentially looking through picked-up photos and videos; and the display screen 23 and the buttons 25 are electrically connected with the second PCB 24, and the second PCB 24 is electrically connected with the first PCB 5.

In a preferred embodiment of the invention, the camera body 1 is provided with a memory card slot 11; a USB interface 12 is formed in one side of the memory card slot 11, and an earphone interface 13 is formed in the other side of the memory card slot 11; the memory card slot 11, the USB interface 12 and the earphone interface 13 are electrically connected with the first PCB 5; and the memory card slot 11 on the camera body 1 is used for storing a memory card to extend the memory capacity of the camera, and the camera body 1 can be connected to external equipment through the USB interface 12 in the camera body 1 to import the photos and the videos into the external equipment; and in a noisy environment, users can listen to the videos through earphones connected to the earphone interface 13 in the camera body 1.

In a preferred embodiment of the invention, the camera body 1 is further provided with an on/off button 14, a cancel button 15, a shooting button 16 and a video recording button 17 which are electrically connected with the first PCB 5; a through hole 18 is formed in a position, corresponding to the lens ring 32 and the far-focus lens 33, of the camera body 1; and the camera body 1 is further provided with a battery pack 19 electrically connected with the first PCB 5.

In a preferred embodiment of the invention, a CPU is arranged on the first PCB 5 and is connected with chips on the near-focus lens 31 and the far-focus lens 33, and the chips are GC1034 chips.

In a preferred embodiment of the invention, the working principle of the invention is as follows: the display screen assembly 2 is switched on and the on/off button 14 is pressed for a short time so as to start up the camera, the near-focus lens 31 starts working, and the far-focus lens 33 stops working; the shooting button 16 is pressed for a short time, so that the camera enters into a shooting mode, and photos are automatically saved; the shooting button 16 is pressed for three seconds, so that the far-focus lens 33 starts to work after software identification, and the near-focus lens 31 stops working; the video recording button 17 is pressed for a long time, so that the camera enters into a video recording mode; the video recording button 17 is pressed for a short time, so that the videos recorded in the video recording mode are automatically saved; the on/off button 14 is pressed for a long time so as to switch off the camera; and unsatisfactory photos or videos can be deleted by means of the cancel button 15, and the cancel button can also be used for canceling work in progress.

The above embodiments are only preferred ones of the invention, and are not intended to limit the patent scope of the invention. All equivalent structures or equivalent process transformations which are made by means of the contents in the specification and the drawings the invention, or direct or indirect applications to other related technical fields should also similarly fall within the patent protection scope of invention.

What is claimed is:

1. A camera having a far-near focus switching function, comprising a camera body, a display screen assembly and a lens assembly, wherein the camera body is connected with the display screen assembly through a rotating shaft, the lens assembly is located in the camera body, and a first PCB is arranged in the camera body; and the lens assembly comprises a near-focus lens, a lens ring, a far-focus lens and a lens holder, wherein the near-focus lens has an end connected with the lens ring and an end connected with the lens holder, the far-focus lens and the lens holder are mounted in the camera body, and the near-focus lens and the far-focus lens are electrically connected with the first PCB.

2. The camera having a far-near focus switching function according to claim 1, wherein the display screen assembly comprises a front screen cover, a rear screen cover, a display screen, a second PCB and buttons, wherein the front screen cover is fixedly connected with the rear screen cover, the second PCB is fixedly arranged between the front screen cover and the rear screen cover, an external surface of the display screen is mounted on a surface of the front screen cover, the buttons are arranged on the front screen cover, the display screen and the buttons are electrically connected with the second PCB, and the second PCB is electrically connected with the first PCB.

3. The camera having a far-near focus switching function according to claim 1, wherein the camera body is provided with a memory card slot which has a side formed with a USB interface and a side formed with an earphone interface, and the memory card slot, the USB interface and the earphone interface are electrically connected with the first PCB.

4. The camera having a far-near focus switching function according to claim 1, wherein the camera body is further provided with an on/off button, a cancel button, a shooting button and a video recording button which are electrically connected with the first PCB.

5. The camera having a far-near focus switching function according to claim 1, wherein a through hole is formed in a position, corresponding to the lens ring and the far-focus lens, of the camera body.

6. The camera having a far-near focus switching function according to claim 1, wherein the camera body is further provided with a battery pack electrically connected with the first PCB.

* * * * *